United States Patent
Payne et al.

(10) Patent No.: US 7,729,317 B2
(45) Date of Patent: Jun. 1, 2010

(54) LOW-IF PRE-PREAMBLE ANTENNA DIVERSITY RECEIVER

(75) Inventors: Adrian W. Payne, Horley (GB); Richard J. Caldwell, Reigate (GB)

(73) Assignee: ST-Ericsson SA, Plan-les-Ouates (CH)

( * ) Notice: Subject to any disclaimer, the term of this patent is extended or adjusted under 35 U.S.C. 154(b) by 811 days.

(21) Appl. No.: 10/535,802

(22) PCT Filed: Nov. 14, 2003

(86) PCT No.: PCT/IB03/05174

§ 371 (c)(1),
(2), (4) Date: May 23, 2005

(87) PCT Pub. No.: WO2004/049594

PCT Pub. Date: Jun. 10, 2004

(65) Prior Publication Data

US 2006/0056357 A1    Mar. 16, 2006

(30) Foreign Application Priority Data

Nov. 26, 2002 (GB) .................................. 0227506.3

(51) Int. Cl.
*H04W 4/00* (2009.01)
(52) U.S. Cl. .................................... 370/334; 455/277.1
(58) Field of Classification Search ................. 370/334; 455/277.1, 277.2, 280
See application file for complete search history.

(56) References Cited

U.S. PATENT DOCUMENTS 4,977,616 A * 12/1990 Linder et al. ............. 455/277.2
5,802,463 A * 9/1998 Zuckerman ................. 455/208
5,940,452 A    8/1999 Rich (Continued)

FOREIGN PATENT DOCUMENTS

WO    WO0203570 A    1/2002

(Continued)

OTHER PUBLICATIONS

Mogensen, P., et al., "Evaluation of an Advanced Receiver Concept for DECT" Vehicular Technology Conference, 1995 IEEE 45th Chicago, IL, USA Jul. 25-28, 1995, New York, NY, USA, Jul. 25, 1995, pp. 514-519, XP010166996 ISBN: 0-7803-2742-X.

*Primary Examiner*—Erika A Gary
(74) *Attorney, Agent, or Firm*—Eric M. Ringer; Seed IP Law Group PLLC

(57) ABSTRACT

An antenna diversity receiver has a low-IF receiving mode and a diversity selection mode, and a switch arrangement for coupling one of the antennas to the IF channels when in the receiving mode, and coupling each of the channels to a different one of the antennas in the selection mode. A diversity controller compares qualities of signals received simultaneously from the different antennas during the selection mode, and controls the switch arrangement in the receiving mode, to use the better antenna. The quality measurement is carried out during reception of a carrier before a preamble to a desired signal is received, so that there is more time to obtain a better signal quality measurement and to enable better averaging over time. The channels have a polyphase filter with switchable cross coupling between the channels, so that it acts as two independent low pass filters in the selection mode.

28 Claims, 4 Drawing Sheets

U.S. PATENT DOCUMENTS

| | | |
|---|---|---|
| 6,014,571 A | 1/2000 | Enoki |
| 6,018,651 A | 1/2000 | Bruckert et al. |
| 6,078,796 A | 6/2000 | Ling |
| 6,424,820 B1 * | 7/2002 | Burdick et al. ............. 455/41.1 |
| 6,535,721 B1 | 3/2003 | Burke et al. |
| 6,563,859 B1 | 5/2003 | Oishi et al. |
| 6,721,550 B1 * | 4/2004 | Okada et al. ............. 455/277.1 |
| 6,757,267 B1 * | 6/2004 | Evans et al. .................. 370/334 |
| 6,871,052 B2 * | 3/2005 | Spencer et al. ........... 455/226.2 |
| 7,302,244 B2 | 11/2007 | Spencer et al. |
| 7,398,067 B2 * | 7/2008 | Wolf ........................... 455/137 |
| 2001/0015999 A1 * | 8/2001 | Nam ........................... 375/148 |
| 2002/0122393 A1 * | 9/2002 | Caldwell et al. ............. 370/328 |
| 2003/0081656 A1 | 5/2003 | Buehrer et al. |
| 2007/0010206 A1 * | 1/2007 | Caldwell et al. ............... 455/64 |

FOREIGN PATENT DOCUMENTS

| | | |
|---|---|---|
| WO | 02/052749 A1 | 7/2002 |
| WO | WO03049323 A | 6/2003 |

\* cited by examiner

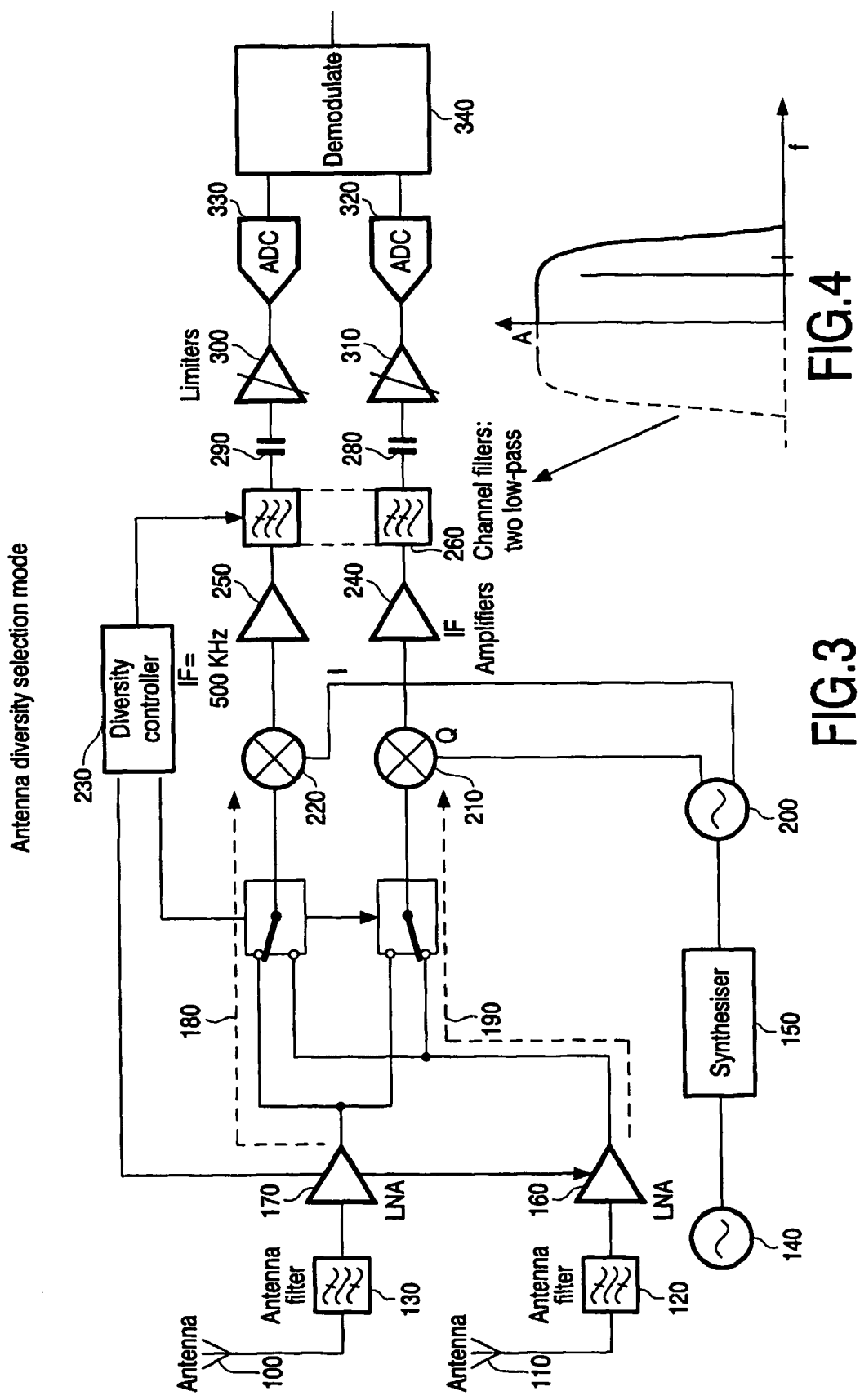

LOW-IF PRE-PREAMBLE ANTENNA DIVERSITY RECEIVER

FIELD OF THE INVENTION

The invention relates to antenna diversity receivers, to terminals having such receivers and to methods of operating communications services over such terminals.

BACKGROUND

Radio communication systems often suffer from the effects of multipath propagation, whereby a transmitted signal reaches a receiver via a plurality of distinct paths from the transmitter. One solution to this problem is antenna diversity, in which two or more receiving antennas are provided for a receiver. Provided the antennas are sufficiently separated so that the signals received at one antenna are substantially uncorrelated with those received by another, when one antenna is in a null another antenna is likely to be able to receive a good signal. An example of a radio communication system which may make use of antenna diversity is a Bluetooth network, operating according to the specification defined by the Bluetooth Special Interest Group. Such a network is intended to provide low-cost, short range radio links between mobile PCs, mobile phones and other devices, whether portable or not. Communication in a Bluetooth network takes place in the unlicensed ISM band at around 2.45 GHz. At such frequencies, antenna separations of the order of a few cm are sufficient for successful diversity operation.

In an antenna diversity receiver, for example that disclosed in U.S. Pat. No. 5,940,452, a diversity controller selects the antenna providing the best signal according to a signal quality measurement, which is most commonly the RSSI (Received Signal Strength Indication). Other measures of channel quality can be used, for example checksums are used in certain cases in a DECT (Digital Enhanced Cordless Telecommunications) system. In a radio communication system in which data is transmitted in packets, it is preferable for the diversity controller to select the optimum antenna on a packet-by-packet basis. This is particularly the case in a frequency-hopping system such as Bluetooth, because successive packets will be sent on different frequencies whose characteristics will not be correlated.

However, implementation of antenna diversity on a packet-by-packet basis requires measurement of the signal quality from each antenna in turn (unless a plurality of receivers is provided, which is not generally a practical solution). The sequential RSSI measurement process employed in known receivers may therefore take too long, particularly if the preamble to each packet is short (for example, that in Bluetooth is only 4 µs long). Accordingly, it was proposed in patent application WO 0203570 to provide an antenna diversity receiver enabling simultaneous comparison of signal quality from two antennas without the need for a plurality of receivers. This involved modifying the switch which selects either the signal from the first antenna or the second antenna, and couples that signal to both in-phase and quadrature channels. The modified switch is able to route the signal from the first antenna to one of the channels and route the signal from the second antenna to the other of the channels. The resultant signals are folded around zero frequency, and therefore cannot be demodulated, but valid signal strength measurements may still be taken for each antenna. A diversity controller is able to compare the signal qualities from the two antennas during a preamble in the transmitted data and to determine which antenna to use for the remainder of the data.

The same patent application indicates that in low-IF (Intermediate Frequency) architectures employing a polyphase filter rather than low pass filters, additional circuitry would be needed for deriving a signal from each of the I and Q channels before they pass through the polyphase filter. Each of these derived signals would then need to be passed through a separate channel filter, to filter out adjacent channel signals, before signal quality measurements could be made. This involves more cost and complexity. In any case, the selection of which antenna to use is still poor because the preamble is so short that the selection is heavily susceptible to random noise during the preamble.

SUMMARY OF THE INVENTION

It is an object of the invention to provide improved apparatus or methods, addressing such problems. According to a first aspect of the invention, there is provided an antenna diversity receiver for use with two or more antennas and being arranged to operate in a low-IF receiving mode and in a diversity selection mode, the receiver having: IF channels, a switch arrangement for coupling one of the antennas to the channels when in the receiving mode, a diversity controller for comparing qualities of signals received simultaneously from the different antennas during the diversity selection mode, and controlling the selection by the switch arrangement in the receiving mode, depending on the comparison, the receiver being arranged to operate in the selection mode during reception of a carrier before a preamble to a desired signal is received.

By using the carrier which may be unmodulated, for the measurements, rather than only a preamble, notably there is likely to be more time to obtain a better signal quality measurement. More time can enable better averaging over time and hence reduced susceptibility to noise. More time can also enable slower or lower tolerance components to be used, to enable lower costs.

A zero-IF (Intermediate Frequency) receiver cannot achieve this in the same way because the unmodulated carrier will produce a DC received signal, which cannot be adequately distinguished from the unwanted DC offsets that will be present at the output of the two channel filters.

Notably, signals from both or all antennas can be measured at the same time, which has advantages over conventional schemes for measuring one antenna then another sequentially. This means the overall time taken can be reduced, typically by half. A consequence of this is that the power consumption can be reduced, which is particularly important for small battery powered receivers. Also, by measuring simultaneously, the measurement time for each signal as a proportion of the overall time is increased, so the measurement can be averaged over a longer period, which can give greater immunity from noise and greater accuracy if the signal strength is varying with time. Also, by measuring simultaneously, there is no inaccuracy caused by the signal strengths into both antennas varying during the measurement period.

Notably it is not essential that the measurement has to be completed before the preamble. If it has not been possible to decide which antenna has the strongest signal before the preamble, then measuring can continue during the preamble. Of course this means reception of the preamble (or any part of the signal) cannot be confirmed until the receiver is switched to receiving mode.

An additional feature of some embodiments is the channels having a complex filter with cross coupling between the channels, for outputting asymmetrically filtered channel signals in the receiving mode, the controller being arranged to use independent low-pass filtered channel signals without coupling between the channels, for the comparison in the selection mode.

Although it is possible in principle to use other filter arrangements, or other signals for the comparison, they would be less convenient and so more expensive to implement.

An additional feature of some embodiments is the filter being a polyphase filter in the form of a complex filter with an asymmetrical frequency response centred around a low-IF with controllable cross coupling between the channels, the controller being arranged to use outputs of the polyphase filter with cross coupling suppressed during the selection mode.

This is particularly useful as it enables the amount of additional circuitry to be kept low, thus keeping costs and size low. This can also result in reduced power consumption in the polyphase filter if the cross-coupling is powered down in the selection mode, As the uncoupled parts of the polyphase filter have a low pass characteristic, there is no longer a need to provide separate low pass filtering for the channel signals used for the comparison.

An additional feature of some embodiments is the diversity controller being arranged to measure the signal quality of the signal received from the selected antenna in the receiving mode. This can be used to corroborate measurements made on the unmodulated carrier in the selection mode.

An additional feature of some embodiments is the diversity controller being arranged to cause the switching arrangement to couple another of the antenna to the channels if the signal quality in the receiving mode is below a threshold. This can be helpful in the case that the measurements made on the received signal are subject to more interference than the measurements on the carrier.

An additional feature of some embodiments is a pass band of the polyphase filter being broadened during the selection mode. This is useful to ensure that measurement accuracy is not reduced by parts of the signal being suppressed by the filter before they are measured. This might happen in an extreme case such as the carrier before the preamble being modulated with a constant "1" or if the intermediate frequency is significantly higher than the bandwidth of the signal.

An additional feature of some embodiments is the diversity controller being arranged to control switching between the selection Mode and the receiving mode according to predetermined time intervals. This is usually arranged to conform to standards according to the type of receiver. In principle an alternative or addition is to determine timings from the received signals.

An additional feature of some embodiments is the receiver being compatible with the Bluetooth standard. This is one of the more important commercially valuable standards.

An additional feature of some embodiments is the controller being arranged to determine a received signal strength indication for each signal. This is a suitable, commonly used measure.

An additional feature of some embodiments is amplifiers for amplifying signals from each of the antennas, arranged so that in the receiving mode, amplifiers corresponding to unused ones of the antennas can be switched off. This can enable power consumption to be kept low, which is particularly important for small mobile battery powered terminals.

An additional feature of some embodiments is having a local oscillator for quadrature mixing with the signals from the antenna, the local oscillator being arranged to have a different frequency for the selection mode, to enable zero-IF operation. This is an alternative to disconnecting the cross coupling of the filter, but has disadvantages of being slower and needing more circuitry, so can be more expensive. Another alternative is to use a lower local oscillator frequency during selection mode in conjunction with disconnecting cross-coupling, such that the signals from the two antennas pass optimally within the bandwidth of the two low-pass filters when in selection mode. During the receive mode a higher intermediate frequency can be used with the higher local oscillator frequency.

An additional feature of some embodiments is the controller being arranged to use the channel signals before the filter, and apply low pass filtering to each of them to determine the signal qualities. This is another alternative to disconnecting cross coupling, but has the disadvantage of needing more circuitry.

An additional feature of some embodiments is the receiver being implemented as one or more integrated circuits.

Another aspect of the invention provides a mobile terminal having an antenna, the receiver of any preceding claim coupled to the antenna, and a processor coupled to the receiver for processing data received by the receiver. This is claimed explicitly as the advantages can feed through to enable better terminals, with much greater added value than the value of the receiver component alone.

Another aspect of the invention provides a method of offering a communication service using the terminal. This is claimed explicitly again as the advantages can feed through to provide improved services with much greater added value than the value of the receiver component alone.

Any of the additional features can be combined together or with any of the aspects of the invention, as would be apparent to those skilled in the art. Other advantages may be apparent to those skilled in the art, especially over other prior art not known to the inventors.

BRIEF DESCRIPTION OF THE DRAWINGS

Embodiments of the invention will now be described by way of example, and with reference to the accompanying drawings, in which:

FIG. 3 shows an embodiment of a receiver, when in a selection mode, FIG. 4 shows a graph of a frequency response of a switchable polyphase filter in the selection mode.

DETAILED DESCRIPTION

Figure 1:
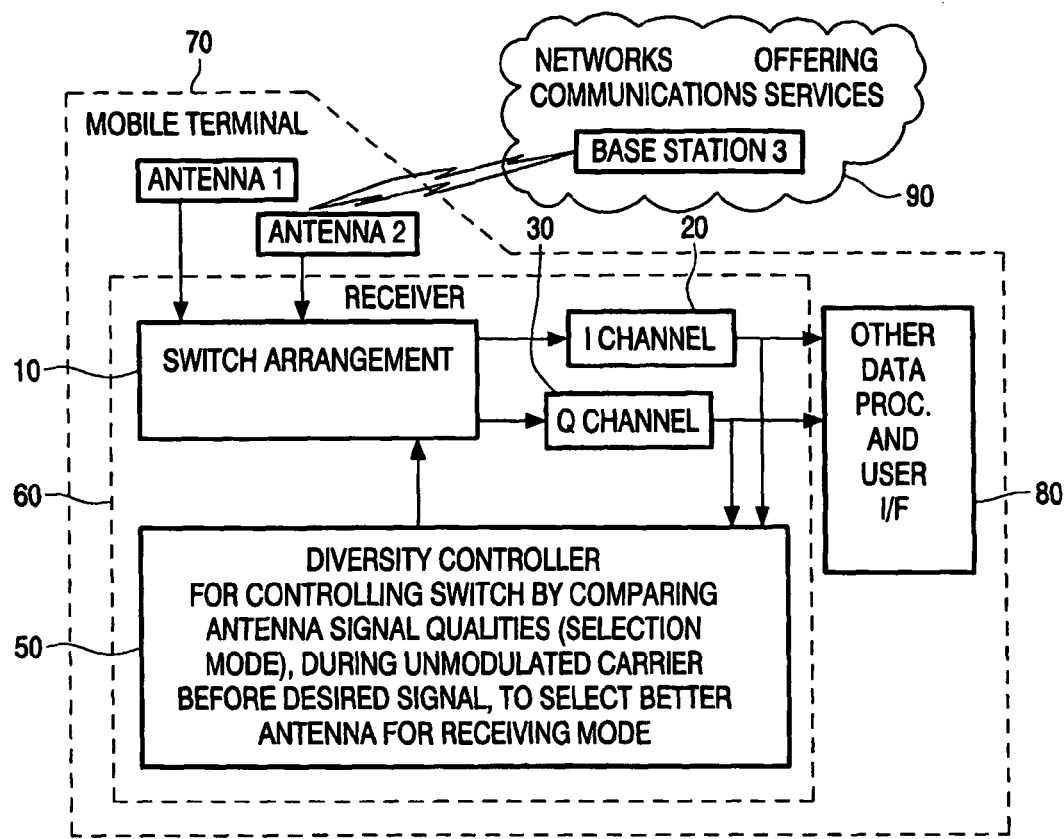
FIG. 1 shows an embodiment of a receiver for use with a wireless link and a network.

FIG. 1, Embodiment of a Receiver Coupled to Network.

FIG. 1 shows an embodiment of a receiver 60 coupled by a wireless link to another wireless terminal 3 which can be incorporated in any type of device. The link can be a bluetooth link or other types. The other terminal can be in a stand alone device or can be coupled to a network or networks 90. One particular application is for receiving data related to communications services offered by an operator over the network, such as voice services or information services for example. The receiver in this example is incorporated in a mobile terminal 70, though in principle it could be applied in a base station. The mobile terminal includes a pair of antennas 1, 2, suitable for spatially diverse reception. Other parts of the mobile terminal such as user interface, data or voice processing functions and so on are represented by part 80. The receiver can be applied in any type of terminal. Typically the receiver will be incorporated in a transceiver, though transmitter parts are not shown for the sake of clarity.

The receiver includes a switch arrangement 10, I and Q channels 20, 30, and a diversity controller 50. Optionally there are other parts of the receiver not illustrated, such as baseband processing of the channels. A feature of a receiver is that two channels (normally I and Q) are required for normal receiving, but each channel can be fed with a different signal during a period of signal quality measurement and comparison. The switch couples the antennas so that one antenna is coupled to both channels in a receiving mode. In a selection mode, the signals from each antenna are processed separately so that the respective signal qualities can be measured simultaneously and compared. The antenna with the better quality is used in the receive mode. The diversity controller enters the selection mode often enough to update the selection as reception conditions change, particularly if the mobile terminal is moving. It can be repeated before each packet or before a sequence of packets for example.

The same I and Q channels as used in the receiving mode can be switched and used for processing the signals to obtain signal quality measurements, as illustrated. Alternatively, in principle, duplicate channels can be used, though this would add circuitry and costs. The receiver can be implemented as an integrated circuit.

Figure 2:
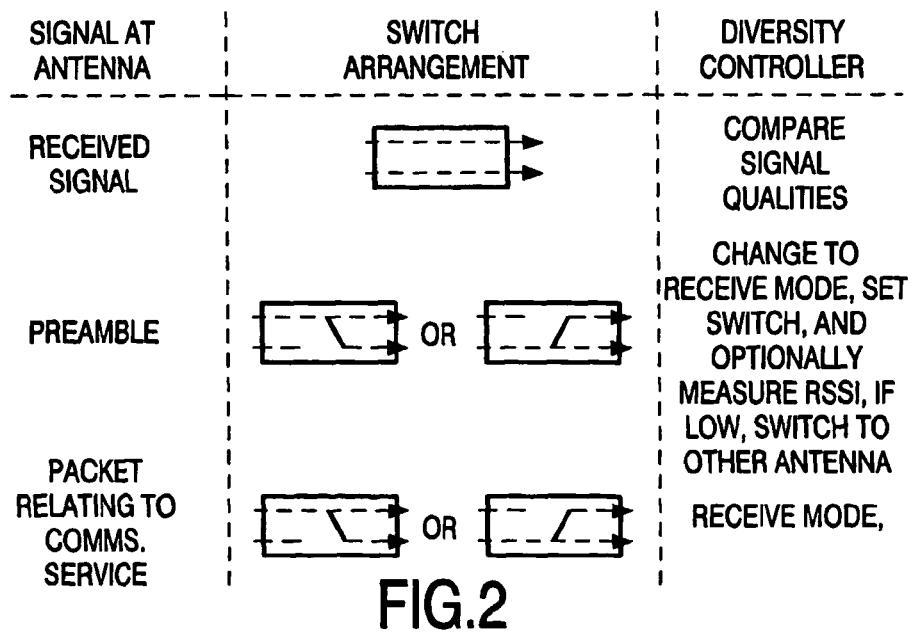
FIG. 2 shows operations of a receiver.

FIG. 2, Receiver Operation

FIG. 2 shows steps in the operation of the receiver of FIG. 1. In a left hand column the state of the signal at the antennas is shown. In the central column the state of the switching arrangement is shown. In the right hand column the operation of the diversity controller is indicated. In the first row, the signals received are unmodulated carrier signals or other unwanted signals or in between desired signals. The diversity controller operates to control the switch arrangement to feed different antenna signals to different channels. The controller measures the signals and compares the signal qualities. This measurement can be carried out over a period of time so that a decision is based on average qualities, to reach a decision on which antenna to use for receiving the subsequent desired signal. The desired signal may be preceded by a preamble as shown in the second row of FIG. 2. At any time before or during the preamble, after the signal quality measurement has been made, the controller changes the mode from section to receiving mode. The preamble can be defined as a sequence of received signal prepending the information part of the signal for purposes of timing synchronisation and/or wanted signal recognition in the receiver.

The switch arrangement as shown in the second row changes so that one antenna, the one selected as a result of the preceding selection mode, is coupled to both channels. The preamble, depending on the air interface standard, may provide enough time to enable the actual signal strength of a demodulated signal to be measured. This can be measured in terms of RSSI as defined in the Bluetooth or other wireless specifications, or other arbitrary measures of signal strength could be used to drive the diversity controller or be converted to the required RSSI format if desired. Optionally this can be carried out by the controller and compared to a threshold. If too low, the controller can try switching to the other antenna before the desired signal arrives. The third row shows the desired signal in the form of a packet of data relating to a communications service arriving at the antennas. The diversity controller is in receive mode in time for the receiver to receive every bit of the packet that is to be received. The switch arrangement is set to couple the selected antenna to both channels. After the packet or string of packets, the controller can return to the selection mode.

FIGS. 3, 4 Embodiment of a Receiver, in Selection Mode

Figures 5, 6:
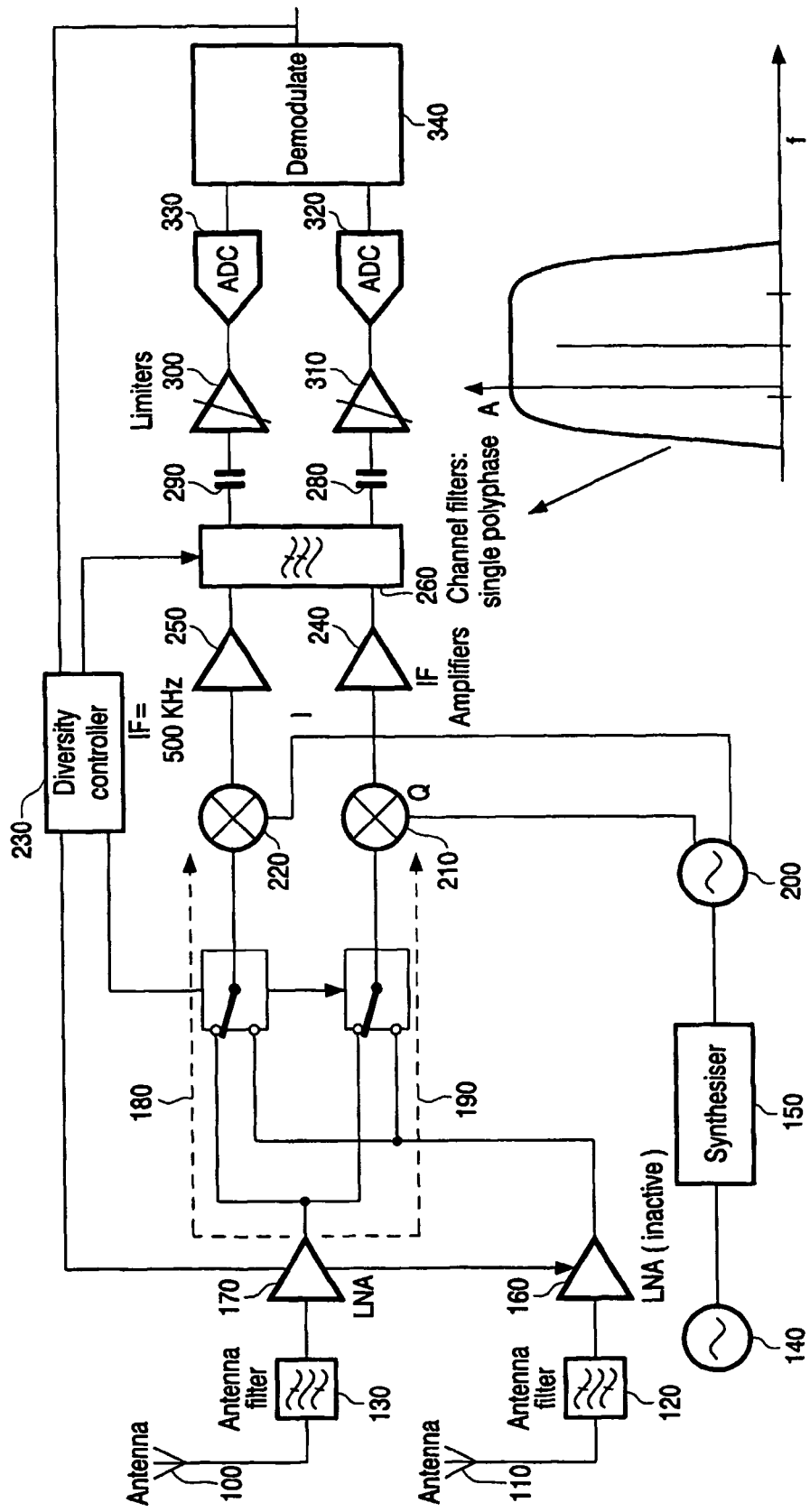
FIG. 5 shows an embodiment of a receiver when in receiving mode.
FIG. 6 shows a graph of a frequency response of a polyphase filter when in the receiving mode.

A block schematic diagram of an embodiment of a receiver is shown in FIG. 3 in the selection mode. The same embodiment is shown in FIG. 5 using corresponding reference numerals, when in the receiving mode. The receiver can be an example of the receiver of FIG. 1 or other receivers. Radio Frequency (RF) signals are received by first and second antennas 100, 110 passed through antenna filters 120, 130, and amplified by respective Low Noise Amplifiers (LNA) 170, 160. At this stage the RF signals are contain a first frequency band which contains a wanted signal, while second and third frequency bands contain unwanted adjacent channel signals.

The outputs of the LNAs are connected to quadrature-related mixers 220, 210 via a switching arrangement in the form of first and second two-way switches 180, 190 controlled by a diversity controller (DC) 230 which compares the received signal qualities. The DC is also coupled to the LNAs to switch off the power to whichever LNA is unused in the receiving mode. When both switches are in the 'up' position, as shown in FIG. 5 discussed below, the receiver behaves in the same way as a conventional low-IF receiver, receiving and processing signals from the first antenna. Similarly, when both switches are in the 'down' position, signals are received from the second antenna only. Although two antenna are illustrated, it is quite possible to have more than two, with multi way switches and a more complex DC to carry out multiple comparisons for example.

The pair of quadrature-related mixers are supplied with In-phase (I) and Quadrature (0) Local Oscillator (LO) signals respectively. The LO signals are generated by a Voltage Controlled Oscillator (VCO) 200, driven by a frequency synthesiser (SYN) 150 having a stable reference signal source 140. The LO signals are offset from the centre of the frequency band including the wanted signal, so the mixers mix the signal to an intermediate frequency. The signals now have a frequency band containing the wanted signal with other frequency bands above and below containing the adjacent channel signals.

Figure 7:
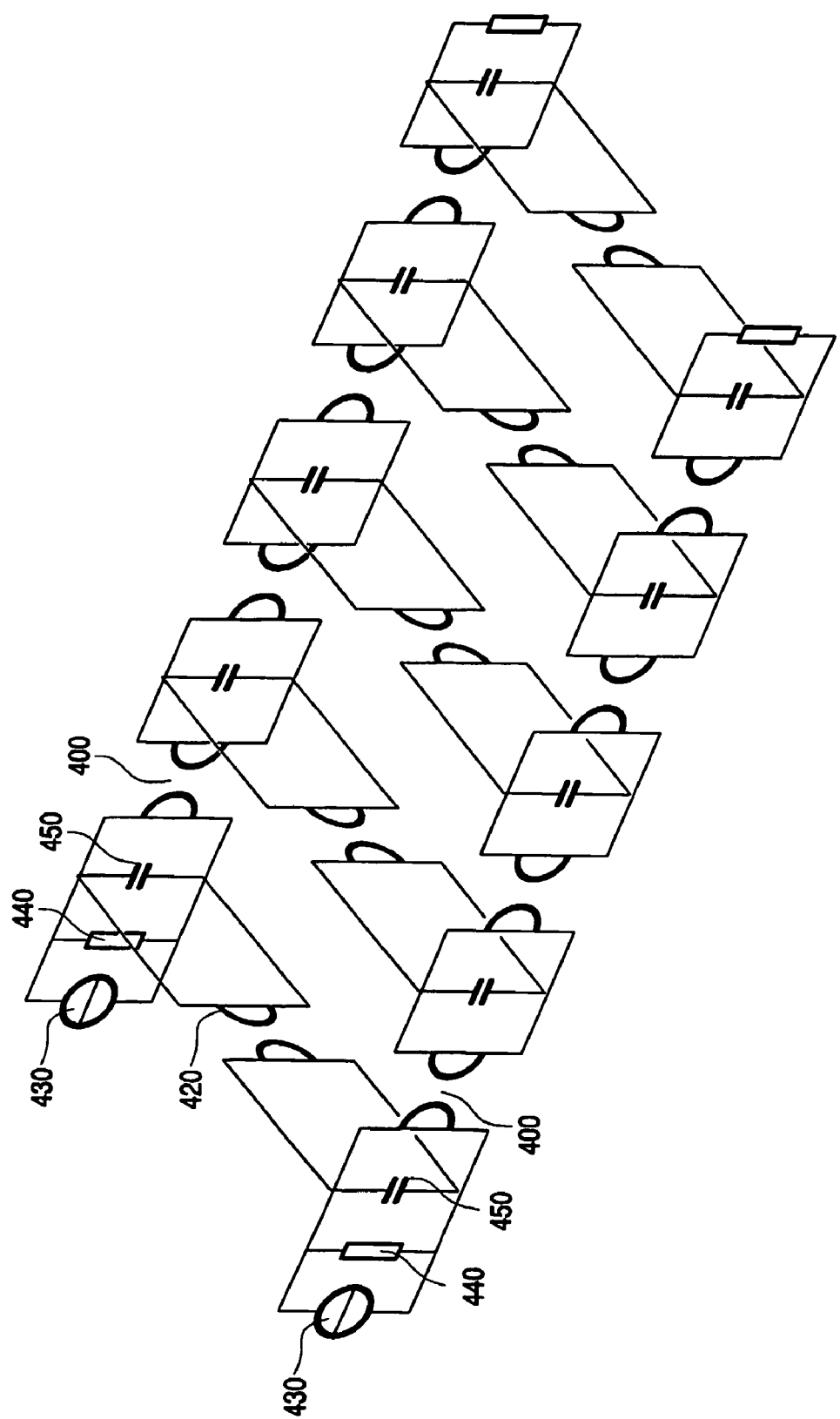
FIG. 7 shows an example of a poly phase filter.

The output signals from the I and Q mixers are then amplified by IF amplifiers 250, 240, then filtered by polyphase I and Q channel filter 260. This filter acts as a channel filter in the receiving mode and as a pair of low pass filters in the selection mode. Polyphase filters are complex active filters with an asymmetrical frequency response centred around a low Intermediate Frequency as shown in FIG. 6. They are useful because they can be used in a low-IF receiver in which unwanted DC offsets are blocked at the output of the demodulator simply by putting capacitors to ac-couple the received signals. This is usually easier to implement than DC-resetting circuitry (or better than tolerating the DC offsets) in a typical zero-IF receiver. Polyphase filters are typically implemented either with op-amps and resistors or with gyrators and capacitors as shown in FIG. 7. In both cases a polyphase filter is composed of a real low-pass filter in each of the I and Q paths and also components for cross coupling I to Q and Q to I. This doubles the size of the two real low-pass filters alone. It is the cross-coupling that shifts the frequency response to the desired IF. If the cross-coupling is disconnected or powered down, as shown in FIG. 4, the centre frequency of the pass band shifts to zero-IF and the bandwidth stays the same unless altered as described below.

Simultaneous signal quality measurements (or comparisons) can be made when the first switch 180 is in the 'up' position and the second switch 190 is in the 'down' position. Signals from the first antenna are fed to the I mixer 220, mixed down to the IF frequency and filtered. The resultant signal cannot be demodulated, but a valid signal strength measurement may still be taken. Similarly, signals from the second antenna are fed to the Q mixer 210 and can have their strength measured after filtering. The fact that signals from the first antenna are mixed with an in-phase LO signal and those from the second antenna are mixed with a quadrature LO signal is of no consequence as it has no effect on the measured signal strength.

The diversity controller is able to compare the signal qualities from the two antennas before a preamble in the transmitted data and to determine which antenna to use for the remainder of the data. The timing of the change of mode from selection mode to receiving mode can be set according to predetermined intervals according to the air interface standard. In the case of Bluetooth, the receiver knows within certain tolerances when to expect a packet, and the duration of a preamble before the packet. These timings are monitored by the DC. If the comparison is not completed in time, the DC can opt to continue the selection mode into the preamble.

Generally the received signal before the preamble is typically much longer than the preamble, perhaps even longer than the packet, at least for Bluetooth signals. This is because it takes a long time to lock the transmit local oscillator to the required frequency within allowed tolerances and because often powering up a power amplifier in the receiver will pull the Local Oscillator LO off frequency, so the LO needs to be (fine-)tuned while the PA is on and consequently during this time it is transmitting something and the receiver can see the signal.

FIGS. 5, 6 Embodiment of a Receiver, in Receiving Mode

FIG. 5 shows the same embodiment as that of FIG. 3, when in the receiving mode. When the comparison of signals from the antennas is complete, and a decision has been taken, the DC enters the receiving mode, as shown in FIG. 5, sets the switches accordingly, and controls the polyphase filter so that the receiver functions as a normal low-IF receiver. The DC also controls the LNAs so that the LNA connected to the unused antenna is switched off during data reception, thereby minimising receiver power consumption. The functions of the DC can be implemented in conventional circuitry with analog and digital parts, for example on the same integrated circuit as the other parts of the receiver.

In the receiving mode, the output signals from the polyphase filter are coupled by capacitors 290, 280 to I and Q limiters 300, 310 before being converted to digital signals by I and Q single-bit Analogue-to-Digital Converters (ADC) 330, 320. The limiters remove amplitude information prior to the inputs to the ADCs. The digital signals are then passed to a Baseband processing block (BB) 340 where they are demodulated. The effects of the spectrum folding can be removed by the baseband processing by use of the I and Q channels.

Compared with a conventional low-IF receiver, the receiver of the embodiment shown requires only a small amount of extra circuitry (one LNA and two switches in the illustrated embodiment) and makes only a small increase in the receiver's power consumption, especially if the extra LNA is switched off during data reception as suggested above.

Alternative structures for the receiver are conceivable, for example, the signal could be demodulated then passed to the base band section. Parts described such as the limiters, ac-coupling and ADCs for example, are all optional depending on the desired implementation.

FIG. 7, Polyphase Filter

FIG. 7 shows an example of a polyphase filter for use in the embodiments described above or in other embodiments. It is formed from two low pass filter arrangements using gyrators and capacitors, with cross coupling between the arrangements. Gyrators are well known for simulating inductance and are made up of transistors and capacitors, which can be readily formed in integrated circuits, unlike inductors. In this illustration, each low pass filter arrangement is formed from a chain of gyrators 400 with a parallel coupled capacitor 450 across the input of each gyrator. The cross coupling is provided by links coupling the inputs of each gyrator with its counterpart in the chain if the other arrangement. Another gyrator 420 is provided in each of the cross coupling links. The inputs of each chain show a signal source 430 and an input impedance 440. The length of the chain can be chosen according to the desired filter characteristics following established principles. To make the polyphase filter switchable, a mechanism is provided for suppressing the cross coupling. This can be achieved simply by reducing or removing the power supply to the gyrators 420 in the cross coupling links, or by other means such as switches in the links.

The frequency response of the filter is shown in FIGS. 4 and 6 as described above. One further enhancement is to alter the response to broaden the pass band for the selection mode. This is useful to address the issue of an extreme case such as the signal before the preamble being modulated with constant "1". This could take it out of band of the now low-pass filter and consequently it could be reduced in strength, and so the measurement would be less accurate. As the same happens for both antennas, the comparison will still be valid. Also, the measurable RSSI is well below the signal level that can be usefully demodulated (i.e. below Sensitivity signal strength), so even if reduced by say 16 dB, it is still enough to be measured. Nevertheless, by widening the filter bandwidth as well as making it low-pass in the selection mode, this issue can be avoided. Typically, provision for varying the bandwidth is built-in anyway to allow it to be tuned optimally for process spreads. This can be done by switching components of the filter in or out, following established design principles.

Other Variations and Concluding Remarks

Variations on the receiver design are possible. For example, the limiters could be removed and the single-bit ADCs substituted by multi-bit ADCs, enabling signal strength measurements to be taken directly from the digital part of the receiver. The embodiment disclosed above is a direct-conversion receiver, in which the RF signal is mixed down directly to the intermediate frequency. However, the present invention is applicable to other low-IF architectures such as those employing a two-stage down-conversion. The channels of the claims can be embodied by all or just parts of the chain of elements shown.

Embodiments have been described with reference to the Bluetooth specification, though it will be apparent that it is applicable to other communication systems in which antenna diversity can be employed, for example UMTS (Universal Mobile Telecommunication System), GSM (Global System for Mobile communications) or DECT.

One possible practical drawback with the polyphase filter described is that when switched to operate as two low-pass filters it no longer rejects an interfering signal in the negative adjacent channel. If there is a negative adjacent signal present then the antenna selection will be based on the combination of the wanted and interfering signals. If the interfering signal is much stronger than the wanted then the best antenna for the wanted signal will be chosen by assessing the RSSI of the interferer and could therefore be wrong. Generally the interferer will be modulated and the wanted won't be, so the interferer will be reduced in strength by the filter more than the wanted. There's a low probability of the interferer causing a problem in Bluetooth receivers given that there are 79 Bluetooth channels, and the worst that happens is that a less optimal antenna is occasionally chosen. For Bluetooth the expected time of arrival can be in error by +−10 μs, so the system should be ready (in receiving mode, in other words, single antenna IQ mode) at least 10 μs early. If the wrong antenna was chosen because of a strong negative adjacent interferer then when receiving the wanted signal properly the measured RSSI will drop. If the RSSI drops below the Sensitivity level, the signal cannot be received. If the Bluetooth signal does not arrive early then there is probably still time to measure the RSSI and if it is too low, switch to the other antenna in the hope that it will be better. This enhancement can help mitigate this interference problem.

A further option is a 'passive polyphase filter'. This is another type of polyphase filter that uses only passive components i.e. uses no current. It has no low-pass frequency response. Instead it just rejects negative frequencies and passes all positive frequencies. So, if the signals are passed though a passive polyphase filter before or after the active polyphase filter and without doing anything different in selection or receive mode, then it will have no affect in receive mode (except perhaps helping to reduce the image resulting from poor IQ imbalance) but in selection mode it will reject the negative adjacent channel and thus remove the problem of making the antenna selection based on a strong negative adjacent interferer. It requires more circuitry to implement this, but at least it requires no extra current.

As has been described above, an antenna diversity receiver has a low-IF receiving mode and a diversity selection mode, and a switch arrangement for coupling one of the antennas to the IF channels when in the receiving mode, and coupling each of the channels to a different one of the antennas in the selection mode. A diversity controller compares qualities of signals received simultaneously from the different antennas during the selection mode, and controls the switch arrangement in the receiving mode, to use the better antenna. The quality measurement is carried out during reception of a carrier before a preamble to a desired signal is received, so that there is more time to obtain a better signal quality measurement and to enable better averaging over time. The channels have a polyphase filter with switchable cross coupling between the channels, so that it acts as two independent low pass filters in the selection mode. Other variations and examples within the scope of the claims will be apparent to those skilled in the art.

The invention claimed is:

1. An antenna diversity receiver for use with two or more antennas and being arranged to operate in a low-IF receiving mode and in a diversity selection mode, the receiver having:
   IF channels,
   a switch arrangement to select one of the antennas to be coupled to the channels when in the receiving mode,
   a diversity controller for comparing qualities of signals received simultaneously from the different antennas during the diversity selection mode, and controlling the selection by the switch arrangement in the receiving mode, depending on the comparison,
   the receiver being arranged to make measurements of a carrier during reception in the selection mode before a preamble to a desired signal is received.

2. The receiver of claim 1, the diversity controller being arranged to measure the signal quality of the signal received from the selected antenna in the receiving mode to corroborate the measurements made on the carrier in the selection mode.

3. The receiver of claim 2, the diversity controller being arranged to cause the switching arrangement to couple another of the antenna to the channels if the signal quality in the receiving mode is below a threshold.

4. The receiver of claim 1, the diversity controller being arranged to control switching between the selection mode and the receiving mode according to predetermined time intervals.

5. The receiver of claim 1, being compatible with the Bluetooth standard.

6. The receiver of claim 1, the diversity controller being arranged to determine a received signal strength indication for each signal.

7. The receiver of claim 1, further comprising amplifiers for amplifying signals from each of the antennas, the receiver being arranged so that in the receiving mode, amplifiers corresponding to unselected antennas can be switched off.

8. The receiver of claim 1, further comprising a local oscillator for quadrature mixing with the signals from the antenna, the local oscillator being arranged to have a different frequency for the selection mode, to enable zero-IF operation.

9. The receiver of claim 1, implemented as one or more integrated circuits.

10. The receiver of claim 1, further comprising a processor coupled to the receiver for processing data received by the receiver.

11. A method of communication using a mobile terminal having plural antennas, the method comprising:
   coupling each respective antenna of the plural antennas to a respective independent low-pass filtered channel by a switch arrangement in a diversity selection mode;
   making measurements of a carrier received simultaneously on the antennas in the diversity selection mode;
   comparing qualities of measurements taken from the multiple antennas during the diversity selection mode;
   coupling an antenna of the plural antennas to a plurality of channels by a switch arrangement in a receiving mode based on the comparing qualities of measurements; and
   cross-coupling the plurality of channels to output asymmetrically filtered channel signals in the receiving mode.

12. The method of claim 11, further comprising measuring a signal quality of a signal received from the selected antenna in the receiving mode to corroborate the measurements made on the carrier in the selection mode.

13. The method of claim 11, further comprising switching between the selection mode and the receiving mode according to predetermined time intervals.

14. The method of claim 11 wherein the mobile terminal includes plural amplifiers, each respective amplifier being coupled to a respective antenna of the plural antennas for amplifying signals therefrom, further comprising switching off at least one amplifier of the plural amplifiers, wherein the antenna of the plural antennas that is coupled to the plurality of channels is not switched off in receive mode.

15. An antenna diversity receiver for use with two or more antennas arranged to operate in a receiving mode and in a diversity selection mode, the receiver comprising:
- IF channels comprising a complex filter with switchable cross coupling between the channels, to output asymmetrically filtered channel signals in the receiving mode;
- a switch arrangement to couple one of the antennas to the channels when in the receiving mode; and
- a diversity controller for comparing qualities of signals received simultaneously from the different antennas during the diversity selection mode, and controlling the selection by the switch arrangement in the receiving mode depending on the comparison, the diversity controller configured to use independent low-pass filtered channel signals without coupling between the channels for the comparison in the diversity selection mode.

16. The receiver of claim 15, the complex filter being a polyphase filter in the form of a complex filter with an asymmetrical frequency response centered around a low-IF with controllable cross coupling between the channels, the controller being arranged to use outputs of the polyphase filter with cross coupling suppressed during the selection mode.

17. The receiver of claim 16 wherein the polyphase filter comprises a broadened pass band during the diversity selection mode.

18. The receiver of claim 15 wherein the controller uses the complex filter to apply low pass filtering to each channel signal to determine the signal qualities.

19. The receiver of claim 15, the diversity controller being arranged to control switching between the selection mode and the receiving mode according to predetermined time intervals.

20. The receiver of claim 15, wherein the receiver is configured to be compatible with the Bluetooth standard.

21. The receiver of claim 15, the diversity controller being arranged to determine a received signal strength indication for each signal.

22. The receiver of claim 15, further comprising amplifiers for amplifying signals from each of the antennas, the receiver arranged so that in the receiving mode amplifiers corresponding to unselected antennas can be switched off.

23. The receiver of claim 15, further comprising a local oscillator for quadrature mixing with the signals from the antenna, the local oscillator being arranged to have a different frequency for the selection mode, to enable zero-IF operation.

24. An antenna diversity receiver for receiving a carrier, comprising:
- a plurality of antennas arranged to receive a carrier of a signal carrying data that is preceded by a preamble;
- at least two channels, each channel configured to demodulate a respective component of the signal;
- a switch arrangement that selectively couples a respective antenna of the plurality of antennas to at least two channels when the receiver is in a receive mode and that selectively couples a first antenna of the plurality of antennas to a first channel of the at least two channels and a second antenna of the plurality of antennas to a second channel of the at least two channels when the receiver is in a select mode; and
- a diversity controller coupled to the switch arrangement and the first and the second channels of the at least two channels and arranged to control the switch arrangement in the receive mode and the select mode of the receiver and compare a respective quality of the signal received at the first antenna during a time span before the preamble with a respective quality the signal received at the second antenna during the same time span before the preamble when the receiver is in the select mode.

25. The receiver of claim 24, comprising a complex filter switchably arranged to cross couple the first channel and the second channels when the receiver is in the receive mode.

26. The receiver of claim 25 wherein the complex filter is switchably arranged to decouple the first channel and the second channels when the receiver is in the select mode.

27. The receiver of claim 25 wherein the diversity controller is arranged to control the switch arrangement to select the respective antenna of the plurality of antennas that is coupled to the at least two channels when the receiver is in receive mode depending on the comparison of the respective qualities of the signal when the receiver is in select mode.

28. The receiver of claim 24 wherein the diversity controller is arranged to determine a respective signal strength indication of the signal at the first antenna and the second antenna, wherein the compared respective qualities of the signal are the respective signal strength indications.

* * * * *